(12) United States Patent
Huang

(10) Patent No.: US 8,742,352 B2
(45) Date of Patent: Jun. 3, 2014

(54) OCCUPANCY SENSOR WITH MULTI-POSITION ROTARY SWITCH

(75) Inventor: Wen-I Huang, Taoyuan County (TW)

(73) Assignee: IR-Tec International Ltd., Taoyuan County (TW)

( * ) Notice: Subject to any disclaimer, the term of this patent is extended or adjusted under 35 U.S.C. 154(b) by 33 days.

(21) Appl. No.: 13/537,501

(22) Filed: Jun. 29, 2012

(65) Prior Publication Data

US 2014/0001362 A1    Jan. 2, 2014

(51) Int. Cl.
*G01J 5/00* (2006.01)

(52) U.S. Cl.
USPC ...................................................... 250/338.1

(58) Field of Classification Search
USPC ...................................................... 250/338.1
See application file for complete search history.

(56) References Cited

U.S. PATENT DOCUMENTS

2007/0123075 A1* 5/2007 Insalaco et al. ............... 439/120

FOREIGN PATENT DOCUMENTS

DE    102005008457    * 8/2006

* cited by examiner

*Primary Examiner* — David Porta
*Assistant Examiner* — Abra Fein
(74) *Attorney, Agent, or Firm* — Muncy, Geissler, Olds & Lowe, P.C.

(57) ABSTRACT

An occupancy sensor has a body and a lens cover. The body includes an enclosure, a human movement sensing component and at least one multi-position rotary switch. The at least one multi-position rotary switch is configured through the enclosure of the body, has a plurality of switching positions and is rotatable between the switching positions. The lens cover is attached to the body and covers the human movement sensing component. With the above-mentioned structure, a user can easily and accurately rotate the multi-position rotary switch to adjust a function of the sensor because the multi-position rotary switch can be positioned in one of the switching positions, and thereby no excessive or deficient adjustment will be made.

4 Claims, 4 Drawing Sheets

OCCUPANCY SENSOR WITH MULTI-POSITION ROTARY SWITCH

BACKGROUND OF THE INVENTION

1. Field of the Invention

The present invention relates to an occupancy sensor, and more particularly to an occupancy sensor with multi-position rotary switch that allows installer to easily, accurately set operation condition of the sensor, such as delay time, ambient light and/or dim level.

2. Description of the Prior Arts

An occupancy sensor can be used to control lighting or heater, ventilation and air conditioner (HVAC) and installed at gateway, staircase, garage, conference room, class room, warehouse or any other place wherever applicable. When an occupancy sensor detects infrared energy emitted by a human body entering its field of view, the sensor will switch on the light or HVAC and keep it on or operating as long as it continues to detect the activities of human body within its field of view. The sensor will switch off the light or HVAC if it does not detect any human activity within a period of pre-set delay time. Thus, the occupancy sensors are commonly used for energy saving by means of shutting off the unneeded lighting or HVAC operation.

The conventional occupancy sensor normally comprises a body including a human movement sensing component, a signal processing circuitry, a power switching device, such as relay or triac, and at least one potentiometer to set the operation condition of sensor, such as delay timer, ambient light level, etc. The potentiometer is normally configured on the body and can be adjusted by user or installer according to the desired operation condition. Take lighting control as an example, common adjustments including delay time which determines the time that light to be switched off after the last motion detected, and the ambient light level which prevents lighting to be switched on during daytime.

To properly set the operation condition of conventional occupancy sensor using the potentiometer has always been a very time consuming and uncertain work for installers due to high tolerance (20-30%) of potentiometer. Therefore, installer will have to spend considerable amount of time in the adjustment and verification cycle. Consider the sensors are normally installed on the ceiling or wall, numerous stair climbing ups and downs is also a physical challenge and risk of fall to installer.

To overcome the shortcomings, the present invention provides an occupancy sensor with multi-position rotary switch to obviate the aforementioned problems.

SUMMARY OF THE INVENTION

The main object of the present invention is to provide an occupancy sensor with multi-position rotary switch that allows a user or installer to easily and accurately set the functions of the sensor.

To achieve the foregoing objective, the occupancy sensor in accordance with the present invention comprises a body and a lens cover. The body includes an enclosure, a human movement sensing component and at least one multi-position rotary switch. The at least one multi-position rotary switch is configured through the enclosure of the body, has a plurality of switching positions and is rotatable between the switching positions. The lens cover is attached to the body and covers the human movement sensing component. With the above-mentioned structure, a user can easily and accurately rotate the multi-position rotary switch to adjust a function of the sensor because the multi-position rotary switch can be positioned in one of the switching positions, and thereby no excessive or deficient adjustment will be made.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
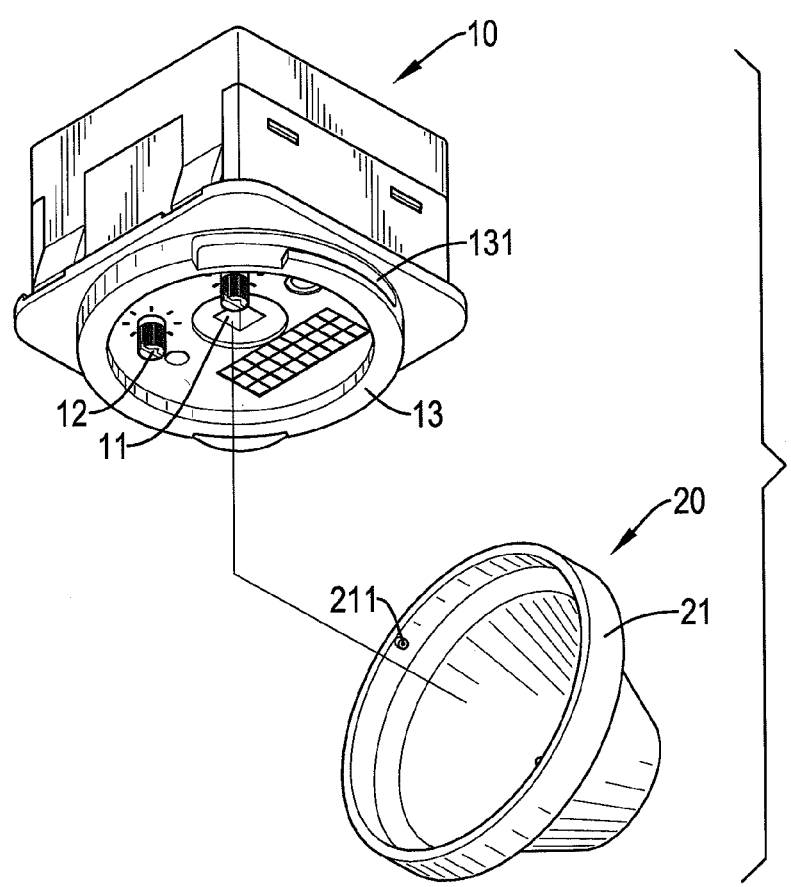
FIG. 1 is an exploded perspective view of an occupancy sensor in accordance with the present invention.
Figure 2:
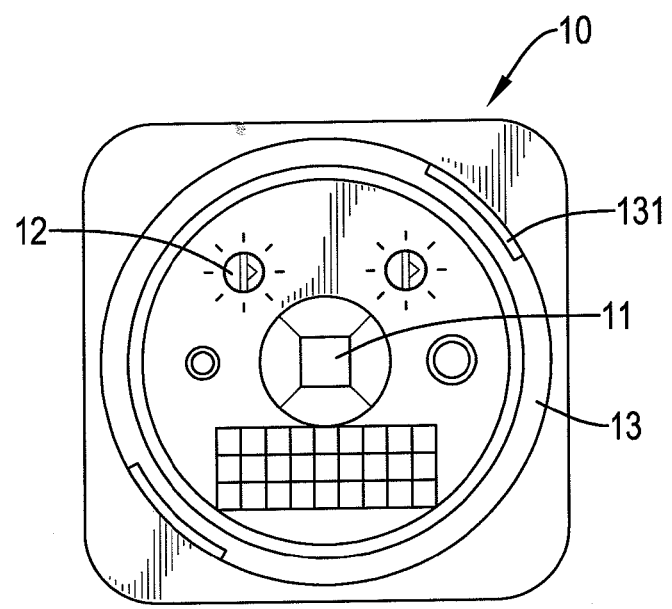
FIG. 2 is a bottom view of a body of the occupancy sensor in FIG. 1.

With reference to FIGS. 1 and 2, an occupancy sensor in accordance with the present invention comprises a body 10 and a lens cover 20.

Figure 3:
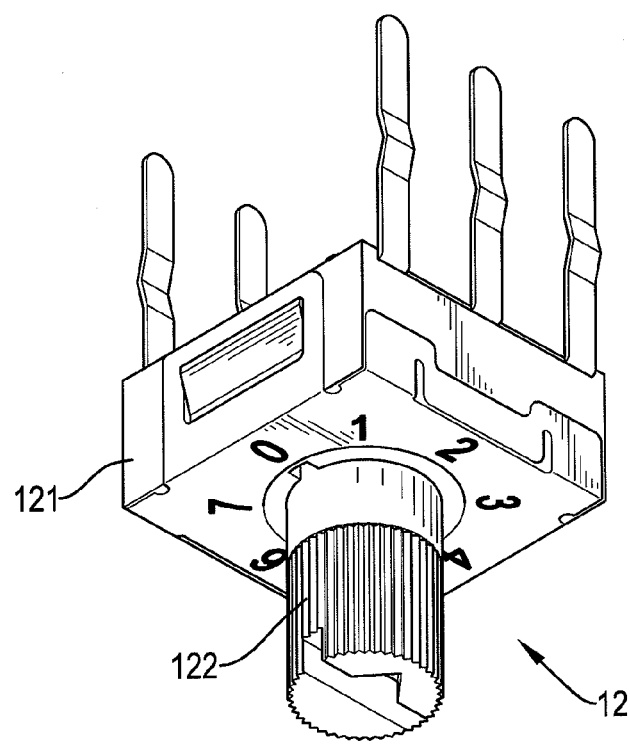
FIG. 3 is an enlarged perspective view of a multi-position rotary switch of the occupancy sensor in FIG. 1.

The body 10 includes an enclosure, a human movement sensing component 11, a signal processing circuitry (not shown), a power switching device (not shown) and at least one multi-position rotary switch 12. The at least one multi-position rotary switch 12 is configured through the enclosure of the body 10, has a plurality of switching positions and is rotatable between the switching positions to adjust a function of the sensor. The multi-position rotary switch 12 may be covered with a cover. With reference to FIG. 3, the at least one multi-position rotary switch 12 consists of a stator 121 and a rotor 122. The stator 121 has contacts disposed thereon (not shown). The rotor 122 may be selectively turned to any one of the switching positions and has a contact thereon (not shown). The contact of the rotor 122 is adapted to press selected ones of the contacts of the stator 121 in the different positions of the rotor 121. The means for electrical connection of the multi-position rotary switch 12 and the human movement sensing component 11, the signal processing circuitry and the power switching device is conventional and thus descriptions thereof will be omitted.

The lens cover 20 is attached to the body 10 and covers the human movement sensing component 11. The lens cover 20 allows infrared energy to pass therethrough to focus on the human movement sensing component 11 so as to expand the field of view of the human movement sensing component 11.

In a preferred embodiment, the body 10 is rectangular prism-shaped and includes a bottom enclosure, the human movement sensing component 11, a plurality of multi-position rotary switches 12 and a ring 13. The human movement sensing component 11 and the multi-position rotary switches 12 are configured on the bottom enclosure of the body 10. The ring 13 extends from the bottom enclosure of the body 10, encloses the human movement sensing component 11 and the multi-position rotary switches 12 and has an outer enclosure and a plurality of grooves 131. The grooves 131 are respectively formed in the outer enclosure of the ring 13. The lens cover 20 is attached to the bottom enclosure of the body 10, covers the sensing element 11 and the multi-position rotary switches 12 and includes an open end and an annular sidewall 21. The annular sidewall 21 extends from the open end of the lens cover 20 and has an inner enclosure and a plurality of projections 211. The projections 211 respectively extend from the inner enclosure of the annular sidewall 21 to correspond to and engage the grooves 131 of the ring 13 of the body 10.

When it is desired to adjust the functions of the occupancy sensor, the user can easily and accurately rotate the multi-position rotary switch 12 because the multi-position rotary switch 12 can be positioned in one of the switching positions, and thereby no excessive or deficient adjustment will be made.

Figure 4:
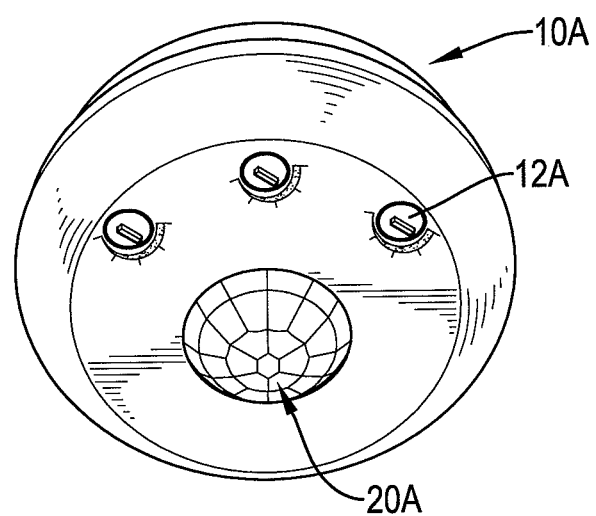
FIG. 4 is a perspective view of another embodiment of an occupancy sensor in accordance with the present invention.

With reference to FIG. 4, in another preferred embodiment, the body 10A is circular plate-shaped and has a bottom enclosure, the human movement sensing component (not shown) and a plurality of multi-position rotary switches 12A. The human movement sensing component and the multi-position rotary switches 12A are configured on the bottom enclosure of the body 10A. The lens cover 20A is attached to the bottom enclosure of the body 10A and covers the human movement sensing component.

Even though numerous characteristics and advantages of the present invention have been set forth in the foregoing description, together with details of the structure and features of the invention, the disclosure is illustrative only. Changes may be made in the details, especially in matters of shape, size and arrangement of parts within the principles of the invention to the full extent indicated by the broad general meaning of the terms in which the appended claims are expressed.

What is claimed is:

1. An occupancy sensor comprising:
a body being rectangular prism-shaped and including:
a bottom enclosure;
a human movement sensing component configured on the bottom enclosure of the body;
a plurality of multi-position rotary switches configured on the bottom enclosure of the body, having a plurality of switching positions and being rotatable between the switching positions to adjust a function of the sensor; and
a ring extending from the bottom enclosure of the body, enclosing the human movement sensing component and the multi-position rotary switches, and having:
an outer enclosure; and
a plurality of grooves respectively formed in the outer enclosure of the ring; and
a lens cover attached to the body, covering the human movement sensing component, and including:
an open end; and
an annular sidewall extending from the open end of the lens cover and having:
an inner enclosure; and
a plurality of projections respectively extending from the inner enclosure of the annular sidewall to correspond to and engage the grooves of the ring of the body.

2. The occupancy sensor as claimed in claim 1, wherein the one multi-position rotary switches are covered with a cover.

3. The sensor as claimed in claim 2, wherein the cover is the lens cover.

4. The occupancy sensor as claimed in claim 1, wherein the body is circular plate-shaped.

* * * * *